Figure 1:
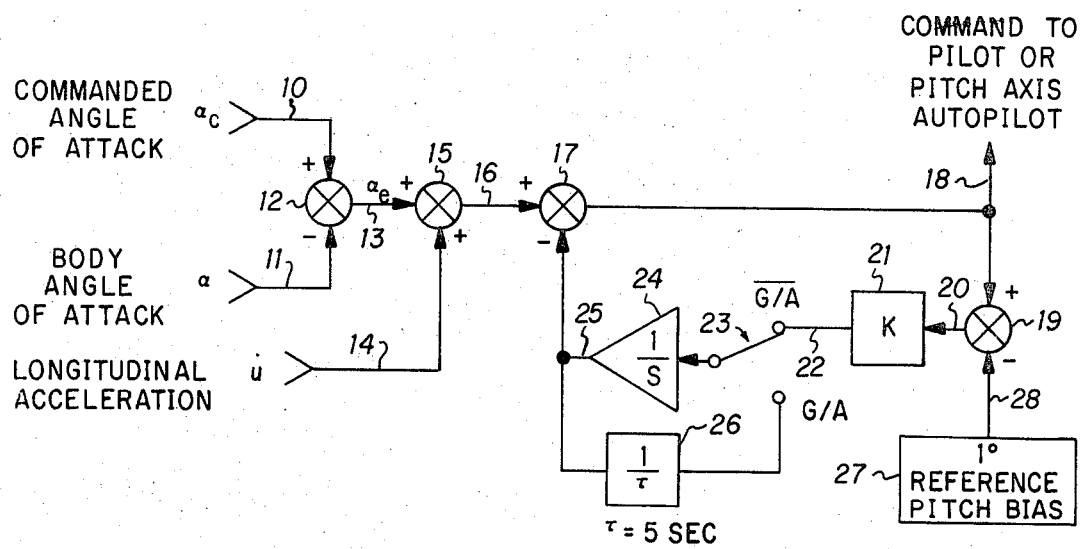

United States Patent [19]
Manke et al.

[11] 3,805,033
[45] Apr. 16, 1974

[54] AUTOPILOT GO-AROUND MODE PITCH COMMAND SIGNAL COMPUTATIONS

[75] Inventors: Girard M. Manke, Los Angeles; Robert F. Tribuno, Santa Monica; Edwin R. Hattendorf, Mission Viejo; Theodore J. Schuldt, Jr., Thousand Oaks, all of Calif.

[73] Assignee: Collins Radio Company, Dallas, Tex.

[22] Filed: Nov. 20, 1972

[21] Appl. No.: 307,912

[52] U.S. Cl........ 235/150.22, 235/150.2, 244/77 G, 244/77 R
[51] Int. Cl............................................. G06g 7/78
[58] Field of Search.................. 235/150.22; 244/77; 73/178 T

[56] References Cited
UNITED STATES PATENTS

| | | | |
|---|---|---|---|
| 3,333,795 | 8/1967 | Hattendorf et al. | 235/150.22 |
| 3,594,553 | 7/1971 | McElroy | 235/150.22 |
| 3,604,908 | 9/1971 | Loome et al. | 235/150.22 |
| 3,447,765 | 6/1969 | Doniger et al. | 235/150.22 |
| 3,681,580 | 8/1972 | Gwathmey et al. | 235/150.22 |
| 3,059,880 | 10/1962 | Buxton | 235/150.22 |
| 3,618,878 | 11/1971 | Klein et al. | 244/77 A |
| 3,359,793 | 12/1967 | Kendall et al. | 244/77 G |

*Primary Examiner*—Malcolm A. Morrison
*Assistant Examiner*—Errol A. Krass

[57] ABSTRACT

In a pitch command signal formulation where command error is damped by longitudinal acceleration, negative angular acceleration experienced during throttle retard in flare mode is precluded from effecting a pitch-down command upon go-around mode initiation by inclusion of a nominal pitch-up bias in conjunction with a synchronizer fader in the command signal formulation.

4 Claims, 2 Drawing Figures

AUTOPILOT GO-AROUND MODE PITCH COMMAND SIGNAL COMPUTATIONS

This invention relates in general to aircraft control systems and more particularly to improvements in go-around mode command signal computations for aircraft control.

Go-around computation modes and control modes typically used in aircraft control systems employ longitudinal acceleration ($\dot{u}$) as an airspeed damping control for the horizontal stabilizer (elevator).

The use of $\dot{u}$ in such systems provides phugoid damping and tends to prevent airspeed from changing too rapidly (which might lead to a stall situation).

With the advent of Category III automatic landing systems, go-around maneuvers are and will frequently be made from considerably lower altitudes, for example, from altitudes less than 50 feet. Most Category III systems employ an autothrottle which retards the throttle when the flare landing mode is initiated. In systems which do not employ an autothrottle control system, the retard is done manually by the pilot during the flare-out prior to touchdown.

Throttle retard (either manual or automatic) creates a problem when go-arounds are initiated when the aircraft is operating in flare mode prior to touchdown. The throttle retard builds up a large steady u which is of a sign to cause a pitch-down command to the stabilizer when go-arounds are initiated during flare mode. The mormal procedure upon initiation of go-around is to cause, either automatically or by pilot response, a throttle advance immediately after go-around initiation along with a pitch-up command to the elevator so as to gian altitude as rapidly as possible within the limitations imposed by safety margin above stall as concerns angle of attack, etc.

Since even in automatic systems there is a finite delay between go-around initiation and airframe response to throttle advance after go-around is initiated, and manual systems there may be an appreciable delay due to various degrees of mismanagement on the part of the pilot to immediately advance the throttle after he initiates go-around, the negative longitudinal acceleration being experienced during throttle retard prior to go-around may cause the aircraft to initially pitch down prior to the desired pitch-up attitude for go-around purposes.

Accordingly the primary object of the present invention is the provision of improvements in aircraft go-around command signal computations wherein the above-defined dangerous pitch-down command transient is prevented from occurring immediately after go-around is initiated during the flare mode of an aircraft landing.

The present invention is featured in means to prevent the longitudinal acceleration which is desired as an airspeed damping control during flare mode from being in the stabilizer command signal computations during that period of time when the longitudinal acceleration may be negative (deceleration prior to a positive $\dot{u}$ being experienced from throttle advance). Stated another way, the present invention is featured in means to prevent longitudinal acceleration from being influential in a go-around command signal computation during the period of time when $\dot{u}$ may be negative prior to throttle advance.

The present invention is generally featured in the elimination of a pitch-down command which might normally be imparted to an aircraft stabilizer upon initiation of a go-around command mode due to the existing steady state longitudinal acceleration being negative at this instant by employing means including a synchronizer-fader in the go-around command computation which ensures that the negative $\dot{u}$ experienced at go-around initiation will not influence the initial go-around rotation. A nominal pitch-up bias is utilized in conjunction with the synchronizer and the fader has a time constant which will counteract any delay the pilot may have before he initiates throttle advance after go-around engagement.

Figure 2:
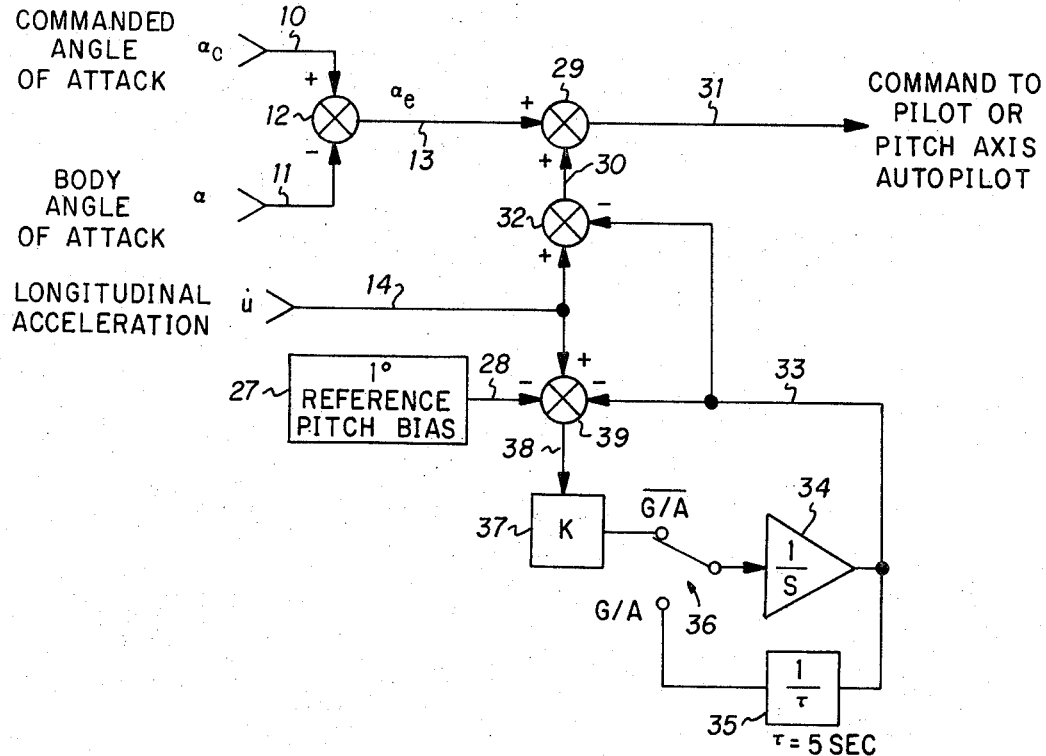

These and other features and objects of the present invention will become apparent upon reading the following description, with reference to the accompanying drawings, in which:

FIG. 1 is a functional diagram of a first embodiment of the invention wherein both the stabilizer command signal and the longitudinal acceleration damping parameter are faded in upon initiation of go-around mode; and FIG. 2 is a functional diagram of a further embodiment of the present invention wherein only the longitudinal damping factor is faded into the ultimate command output signal.

A basic pitch command formulation for use in go-around mode is illustrated in the left-hand portion of FIG. 1. The system might operate generally on an angle of attack command basis whereby the pitch axis of the aircraft is so controlled that a predetermined safety margin over stall is maintained for all flight conditions. Thus, a commanded angle of attack signal $\alpha_c$ and the body angle of attack signal $\alpha$ (the experienced angle of attack as measured by a sensor) might be applied as respective and mutually subtractive inputs 10 and 11 to a signal combining means 12. The output 13 from signal combining means 12 then becomes angle of attack error ($\alpha_e$) and corresponds to the discrepancy between a particular angle of attack being commanded and the actual angle of attack being experienced. As above mentioned longitudinal acceleration $\dot{u}$ may be additionally applied or mixed with the angle of attack error signal for purposes of introducing air speed damping and providing phugoid damping. Thus a longitudinal acceleration signal might be applied as an input 14 to a further signal combining means 15 to be additively combined with the angle of attack error signal 13. The output 16 from signal combining means 15 thus comprises the summation of angle of attack error $\alpha_e$ and longitudinal acceleration $\dot{u}$.

Were the summation appearing at the output 16 of signal cimbining means 15 applied directly as a command to a pilot or pitch axis autopilot to control the aircraft stabilizer, as is commonly done in known systems, such a signal computation might, in response to negatively sensed longitudinal acceleration signals being experienced during throttle retard in flare mode, institute a negative pitch command (pitch-down) upon go-around mode initiation. This negative pitch command is diametrically opposed to the desired pitch-up command which should be instituted at this time. A command transient commanding a pitch-down attitude would be (if not dangerous) at least unnaturally opposed to the instinctive pitch-up command needed for a go-around maneuver.

The present invention, as depicted in the FIG. 1 embodiment, prevents the negatively sensed longitudinal acceleration which might normally be experienced at go-around mode initiation from causing a pitch-down command to the pilot in a manual system, or pitch-down response in the case of an automatic control system. The desired longitudinal acceleration damping factor is prevented from being influential in the command signal mix for a discrete period of time after initiation of go-around, which period of time is nomially sufficient for throttle advance after go-around initiation to assure a positive longitudinal acceleration input signal to the signal mix.

Accordingly, the embodiment of FIG. 1 does not apply the output 16 from signal combining means 15 (corresponding to the summation of angle of attack error $\alpha_e$ and the longitudinal acceleration $\dot{u}$) directly as a command output to a pilot or pitch axis autopilot. The output 16 is mixed with the output of a synchronizer-fader loop which incorporates a reference pitch-up bias. With reference to FIG. 1, the output 16 from signal combining means 15 is applied as a first input to a further signal combining means 17. The output 18 from combining means 17 comprises the command output and is additionally applied as a first input to a further signal combining means 19 to which a reference pitch-up bias source 27 is applied as a subtractive second input. The output 20 from signal combining means 19 is applied through a gain factor element 21 to provide an output 22 therefrom which is selectively applied through switching means 23 as input to a signal integrator 24. The output 25 from signal integrator 24 is applied as a second (subtractive) input to combining means 17. The output 25 from integrator 24 is additionally applied to a time constant means 26 through which the integrator output 25 may be selectively applied as input to the integrator (in lieu of the output of combining means 19) via switch 23.

Mode switch 23 is illustrated in a first position designated $\overline{G/A}$ (corresponding to operational modes other than go-around being experienced). When go-around is initiated by the pilot, mode switch 23 switches to the second position, designated G/A.

Considering then the operation of the system of FIG. 1 prior to the initiation of go-around mode (mode switch 23 in the illustrated $\overline{G/A}$ position) the output 25 of integrator 24 will, due to synchronization, be equated to the output 16 from signal combining means 15 minus pitch up bias 27. Thus the output from combining means 17 may be expressed as:

$$(\alpha_e + \dot{u}) - (\alpha_e + \dot{u} - \alpha_{bias})$$

(1)

The second term of expression (1) defines the integrator output, and expression (1) is seen to equate to $\alpha_{bias}$. Thus the output from combining means 17, which corresponds to the system command output, is synchronized to be equated to the reference pitch bias $\alpha_{bias}$ during flare mode ($\overline{G/A}$).

Upon initiation of go-around mode, mode switch 23 switches to the G/A position to apply the output 25 of the integrator 24 through the time constant means 26 to bleed off the integrator output towards zero. As the integrator output 25 fades out toward zero, the output 18 of combining means 17 (with reference to expression (1)) becomes $\alpha_e + \dot{u}$. However the output of combining means 17 does not become $\alpha_e + \dot{u}$ until after a sufficient period of time (the time established by the time constant means 26) has lapsed to assure that a throttle advance instituted subsequent to go-around being initiated has resulted in a positively sensed longitudinal acceleration input signal 14 to combining means 15. Thus, effectively, the longitudinal acceleration signal $\dot{u}$ applied in the signal mix is washed out prior to go-around being initiated and then faded back in during a period of time after go-around is initiated such as to counteract any delay in throttle advance after go-around engagement. It is seen that the output command signal 18, at the instant of go-around initiation, is equal to the pitch-up bias 27 since the loop had synchronized to that value at the output 18. This positive bias may then be nominally chosen to counteract any negatively sensed longitudinal acceleration being experienced at the instant of go-around initiation.

FIG. 2 illustrates a further embodiment of preventing negatively sensed longitudinal acceleration from causing a pitch-down command at the initiation of go-around. In the embodiment of FIG. 2 the synchronizing loop, the fading time constant, and the reference pitch bias are associated with the longitudinal acceleration input parameter per se rather than with the summation of longitudinal acceleration and angle of attack error. Accordingly the embodiment of FIG. 2 (as in FIG. 1) illustrates a mix of commanded angle of attach $\alpha_c$ and experienced angle of attack $\alpha$ by applying inputs 10 and 11 to a signal combining means 12. The output 13 from signal combining means 12 again comprises angle of attack error $\alpha_e$, corresponding to the discrepancy between a commanded angle of attack and an experienced angle of attack. The angle of attack error output signal 13 from signal combining means 12 is applied as a first input to a further combining means 29. The output 31 of combining 29 constitutes the output command to a pilot or pitch axis autopilot.

The longitudinal acceleration input signal 14 (in the embodiment of FIG. 2) is applied as the sole input to a signal synchronizing and fading means in conjunction with the reference pitch-up bias source 27. Longitudinal acceleration signal 14 is applied as a first input to first and second signal combining means 32 and 39. The reference pitch-up bias source 27 provides a subtractive input 28 to combining means 39. The output from signal combining means 39 is applied to a gain element 37, and selectively through a mode switch 36, an an input to an integrator 34. The output 33 from integrator 34 is applied as a subtractive input to signal combining means 32 and to signal combining means 39. The output 33 from integrating means 34 is additionally applied through a time constant means 35 for selective application therethrough (via mode switch 36) to the input of integrator 34.

In operation the synchronizer-fader loop operates on the longitudinal acceleration input parameter as subsequently combined with angle of attack error as follows. With the mode switch 36 in the illustrated $\overline{G/A}$ position (prior to go-around initiation) the output 38 from signal combining means 39 may be defined as $$\dot{u} - \alpha_{bias} - (\dot{u} - \alpha_{bias}).$$

(2)

The last term in expression (2) is the closed loop integrator output 33 which equates itself to inputs 14 and 28 to combining means 39 to null the output 38 from combining means 39. Thus, the the steady state condition prior to go-around being initiated, the output 38 from signal combining means 39 is zero while the output 33 from the integrator 34 is equal to $\dot{u} - \alpha_{bias}$. The output 30 from signal combining means 32 is equal to $\dot{u} - (\dot{u} - \alpha_{bias})$ which reduces to $\alpha_{bias}$ and, in the steady state condition prior to go-around initiation, the output 30 from signal combining means 32 is synchronized or referenced to the nominal pitch-up reference bias from the source 27.

When go-around is initiated, the nominal pitch-up bias on output 30 of combining means 32 is additively combined with the angle of attack error signal to assure a pitch-up attitude. With mode switch 36 now in the go-around position G/A the output 33 from integrator 34 is bled off through time constant means 35 and is faded out of the computation. Thus the output 30 of combining means 32 ($\dot{u} - \alpha_{bias}$) (since the second term, the integrator output 33, is faded out, becomes equal to u, but only after sufficient time has lapsed, due to the fading action, to ensure that the u signal 14 is positively sensed in response to the throttle advance initiated after go-around initiation.

As in the FIG. 1 embodiment, negatively sensed longitudinal accelerations which might be existing at the initiation of go-around are prevented from being influential in output command formulation, a nominal pitch-up bias is applied immediately at go-around mode initiation to ensure a pitch-up attitude, and the longitudinal acceleration input signal 14 (desired for damping in the computation) is, in essence, faded back into the computation after a period of time which assures that the sense of this signal will be that commanding a pitch-up attitude.

Each of the embodiments of FIGS. 1 and 2 ensures that a negative u signal will not influence the initial go-around rotation commanded by the output pitch command signal and provides a fading means which will counteract any delay the pilot may have before he initiates throttle advance after go-around engagment.

A fundamental difference between the embodiments of FIGS. 1 and 2 is that the FIG. 1 embodiment fades in both the command signal and longitudinal acceleration at go-around initiation while the FIG. 2 embodiment fades in only the longitudinal acceleration signal. Both embodiments, however, fade out the nominal pitch-up reference bias after a period of time determined by the value of $\tau$ in the respective time constant elements 26 and 35.

Although the present invention has been described with respect to particular embodiments thereof, it is not to be so limited as changes might be made therein which fall within the scope of the invention as defined in the appended claims.

What is claimed is:

1. In a pitch command signal development system for developing a command signal for go-around mode in an aircraft control system which system includes an error command signal input parameter corresponding to the discrepancy between a commanded condition and an experienced condition and including signal adding means for additively summing therewith a signal proportional to the longitudinal acceleration of said aircraft; means for precluding negatively sensed longitudinal acceleration signals experienced at the initiation of go-around flight control mode from producing a pitch-down command signal comprising; signal synchronizing means receiving said longitudinal acceleration signal and a reference pitch-up command bias as inputs thereto, said signal synchronizing means including means for producing an output signal, said output signal being input to said signal adding means for combining with said longitudinal acceleration signal. synchronizing said error command signal to said reference pick-up command bias signal prior to go-around initiation, and further including signal fading means operative at go-around initiation to fade out said reference pitch-up command bias signal at a predetermined rate while simultaneously fading said longitudinal acceleration signal into said additive summation with said error command signal.

2. A control means as defined in claim 1 wherein said signal means comprises a first signal combining means to which said error command signal is applied as a first input, the output of said first signal combining means comprising said output command signal, a second signal combining means receiving said longitudinal acceleration signal as a first input thereto and providing an output applied as a second input to said first signal combining means; said synchronizing means comprising a third signal combining means receiving said longitudinal acceleration signal and said reference pitch-up bias command signal as mutually subtractive inputs thereto, integrating means, switching means to which the output of said third signal combining means is selectively applied as input to said integrating means, the output from said integrating means being applied as a subtractive third input to said third signal combining means, signal translating means, said signal translating means having a predetermined time constant, and said switching means selectively connecting said signal translating means between the input and output of said integrating means while disconnecting the output of said third signal combining means, from the input to said integrating means upon go-around mode being effected.

3. In a pitch command signal development system for developing an output command signal for go-around mode in an aircraft control system which system includes an error command signal input parameter corresponding to the discrepancy between a commanded condition and an experienced condition and including the summation therewith of a signal proportional to the longitudinal acceleration of said aircraft; means for precluding negatively sensed longitudinal acceleration signals experienced at the initiation of go-around flight control mode from producing a pitch-down output command signal comprising; signal synchronizing means receiving said summation of error command signal and longitudinal acceleration signal and a reference pitch-up command bias as inputs thereto, said signal synchronizing means including means for producing an output signal for combining with said aforedefined summation which is synchronized to the difference between said reference pitch-up command bias signal and said summation signal prior to go-around initiation, and further including signal fading means operative upon go-around initiation to fade out said difference signal at a predetermined rate while simultaneously fading said longitudinal acceleration signal into said summation with said error command signal.

4. A control means as defined in claim 3 wherein said signal synchronizing means comprises a first signal combining means to which the summation of said error command signal and said longitudinal acceleration signal is applied as a first input, the output of said first signal combining means comprising said output command signal, a second signal combining means receiving said output command signal and said reference pitch-up command bias signal as mutually subtractive inputs thereto, integrating means, switching means through which the output of said second signal combining means is selectively applied as input to said integrating means, the output from said integrating means being applied as a subtractive input to said first signal combining means, signal translating means, said signal translating means having a predetermined time constant, and said switching means selectively connecting said signal translating means between the input and output of said integrating means while disconnecting the output of said second signal combining means from the input to said integrating means upon go-around mode being effected.

* * * * *

UNITED STATES PATENT OFFICE
CERTIFICATE OF CORRECTION

Patent No. 3,805,033            Dated April 16, 1974

Inventor(s) Girard M. Manke et al

It is certified that error appears in the above-identified patent and that said Letters Patent are hereby corrected as shown below:

Column 1, line 28 - change "u" to --u̇-- line 31 - change "mormal" to --normal-- line 35 - change "gian" to --gain-- line 40 - after "and" insert --in--

Column 3, line 10 - change "nomially" to --nominally--

Column 4, line 7  - change "u" to --u̇-- line 36 - after "combining" insert --means-- line 47 - change "an" to --as-- line 68 - change "the", first occurrence, to --in--

Column 5, line 18 - change "u" to --u̇-- line 20 - change "u" to --u̇-- line 35 - change "u" to --u̇--

Column 6, line 5  - change the period "." to a comma --,-- line 7  -  change "pick-up" to --pitch-up--;

line 15 - after "signal" insert --adding--.

Signed and sealed this 13th day of August 1974.

(SEAL)
Attest:

McCOY M. GIBSON, JR.            C. MARSHALL DANN
Attesting Officer               Commissioner of Patents